US012010481B2

(12) United States Patent
Velican

(10) Patent No.: US 12,010,481 B2
(45) Date of Patent: Jun. 11, 2024

(54) ACOUSTIC FILTER FOR A COAXIAL ELECTRO-ACOUSTIC TRANSDUCER

(71) Applicant: BLUEPRINT ACOUSTICS PTY LTD, Victoria (AU)

(72) Inventor: Zeljko Velican, Victoria (AU)

(73) Assignee: BLUEPRINT ACOUSTICS PTY LTD, Victoria (AU)

( * ) Notice: Subject to any disclaimer, the term of this patent is extended or adjusted under 35 U.S.C. 154(b) by 691 days.

(21) Appl. No.: 17/260,896

(22) PCT Filed: Jul. 12, 2019

(86) PCT No.: PCT/AU2019/050734
§ 371 (c)(1),
(2) Date: Jan. 15, 2021

(87) PCT Pub. No.: WO2020/014734
PCT Pub. Date: Jan. 23, 2020

(65) Prior Publication Data

US 2021/0297768 A1 Sep. 23, 2021

(30) Foreign Application Priority Data

Jul. 17, 2018 (AU) ................................ 2018902579

(51) Int. Cl.
*H04R 1/28* (2006.01)
*H04R 1/24* (2006.01)
*H04R 3/14* (2006.01)

(52) U.S. Cl.
CPC ............ *H04R 1/2869* (2013.01); *H04R 1/24* (2013.01); *H04R 1/2849* (2013.01); *H04R 3/14* (2013.01)

(58) Field of Classification Search
CPC .......... H04R 1/24; H04R 1/26; H04R 1/2896; H04R 1/2869
See application file for complete search history.

(56) References Cited

U.S. PATENT DOCUMENTS 3,146,848 A * 9/1964 Fundingsland ........ H04R 1/288 381/186
3,943,304 A * 3/1976 Piribauer ................. H04R 1/24 381/372

(Continued)

FOREIGN PATENT DOCUMENTS

AU 2004204987 A1 * 7/2004 ........... H04R 1/2819
EP 0896497 A2 2/1999

(Continued)

OTHER PUBLICATIONS

J. K. Hilliard, "Portable and Semiportable Loudspeaker Systems for Reproducing 16-mm Sound on Film," in Journal of the Society of Motion Picture Engineers, vol. 49, No. 5, pp. 431-438, Nov. 1947, doi: 10.5594/J12675 (Year: 1947).*

(Continued)

*Primary Examiner* — Dedei K Hammond
*Assistant Examiner* — Joseph James Peter Illicete
(74) *Attorney, Agent, or Firm* — Kilpatrick Townsend & Stockton LLP

(57) ABSTRACT

An acoustic filter suitable for an electro-acoustic transducer includes a relatively high frequency driver and a relatively low frequency driver situated on a common axis. The acoustic filter includes a baffle body having an outer side and an inner side, such that the outer side serves as a baffle for the high frequency driver. The inner side forms a first wall of a Helmholtz resonator including a chamber and a vent duct communicating with the chamber.

11 Claims, 4 Drawing Sheets

(56) References Cited

U.S. PATENT DOCUMENTS

| | | | | |
|---|---|---|---|---|
| 4,379,951 | A * | 4/1983 | Gabr | H04R 7/18 181/161 |
| 5,373,565 | A | 12/1994 | Watanabe | |
| 7,113,607 | B1 * | 9/2006 | Mullins | H03G 11/002 381/103 |
| 7,433,483 | B2 | 10/2008 | Fincham | |
| 9,503,805 | B2 * | 11/2016 | Huang | H04R 1/26 |
| 9,578,403 | B2 * | 2/2017 | Lim | H04R 1/24 |
| 2005/0129258 | A1 | 6/2005 | Fincham | |
| 2006/0023903 | A1 | 2/2006 | Hayashi et al. | |
| 2013/0308786 | A1 * | 11/2013 | Sibbald | H04R 1/1083 381/71.6 |

FOREIGN PATENT DOCUMENTS

| | | | |
|---|---|---|---|
| JP | 05-095595 | A | 4/1993 |
| JP | 2006-041891 | A | 2/2006 |
| JP | 2006-060625 | A | 3/2006 |
| JP | 50-037423 | B2 | 9/2012 |
| WO | 2018/193154 | A1 | 10/2018 |
| WO | 2020/112653 | A1 | 6/2020 |

OTHER PUBLICATIONS

Chang, J. R., & Wang, C. N. (2019). Acoustical analysis of enclosure design parameters for microspeaker system. Journal of Mechanics, 35(1), 1-12 (Year: 2019).*

Kejing Ma, Ting Tan, Zhimiao Yan, Fengrui Liu, Wei-Hsin Liao, Wenming Zhang, Metamaterial and Helmholtz coupled resonator for high-density acoustic energy harvesting, Nano Energy, vol. 82, 2021, 105693, ISSN 2211-2855 (Year: 2021).*

International Search Report and Written Opinion dated Jan. 23, 2020 for International Appl. No. PCT/AU2019/050734.

Extended European Search Report dated Mar. 14, 2022, for EP Appl. No. 19837051.2, 10 pages.

1st Examination report received for Indian Appl. No. 202137003833, dated Sep. 13, 2022, 5 pages.

JP 2021-502494 , "Examination report", with Machine Translation, dated Feb. 7, 2023, 8 pages.

Application No. CN 201980047767.0 , First Office Action, with English Translation, dated Oct. 30, 2023, 17 pages.

* cited by examiner

Fig 1b
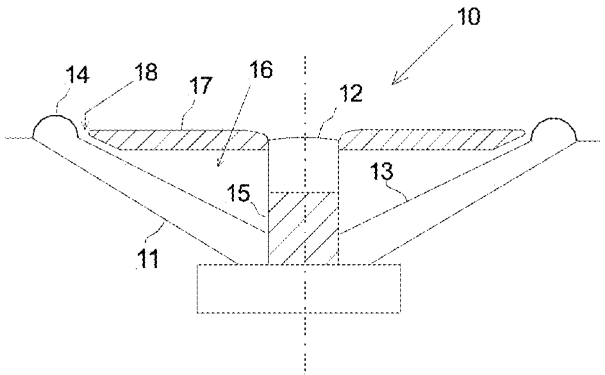
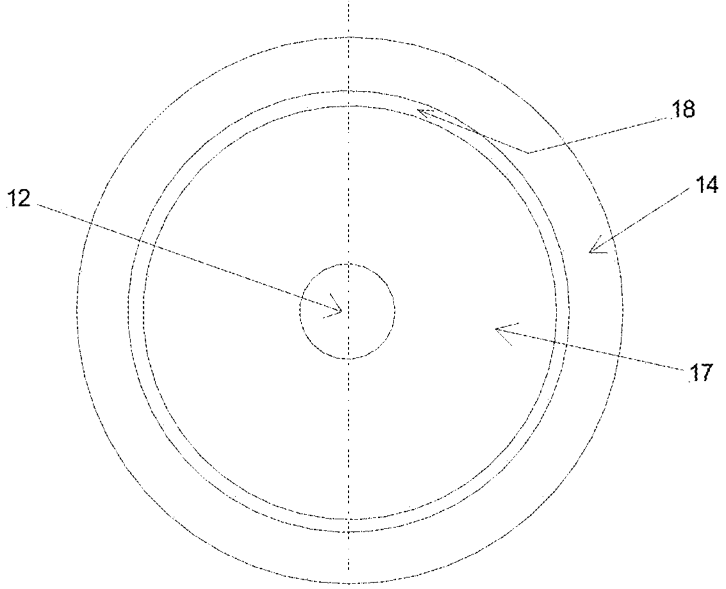
Fig 1a

Fig 2b
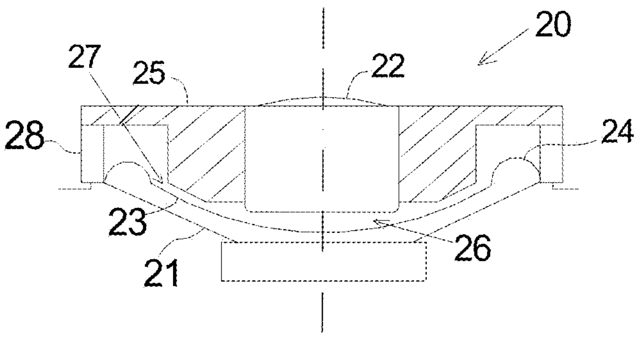
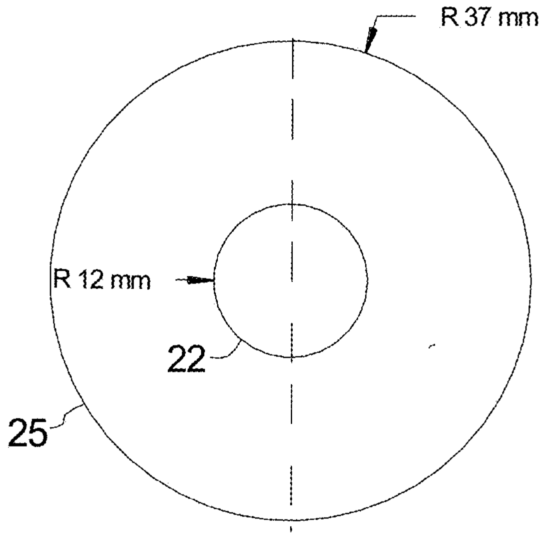
Fig 2a

ACOUSTIC FILTER FOR A COAXIAL ELECTRO-ACOUSTIC TRANSDUCER

CROSS-REFERENCE TO RELATED APPLICATIONS

This application is a U.S. National Phase of International Application No. PCT/AU2019/050734, filed Jul. 12, 2019, which claims priority to Australian Application No. 2018902579, filed Jul. 17, 2018 the disclosures of which are hereby incorporated by reference in their entirety.

TECHNICAL FIELD

The present invention relates to loudspeakers and in particular to an acoustic filter for a coaxial electro-acoustic transducer.

Definitions

Throughout this specification "electro-acoustic driver" or "driver" includes a loudspeaker transducer. "Coaxial driver" includes two or more drivers in a composite or substantially coaxial alignment or structure. "Loudspeaker" includes one or more drivers mounted in an enclosure or baffle. "Piston range" includes a range of frequencies wherein the corresponding wavelength is greater than the circumference of a driver. The upper limit of piston range is sometimes defined as the frequency at which ka=1 wherein k=wave number (2 pi/wavelength) and a=piston radius. Circumference of a driver includes its effective diameter as understood in the art multiplied by pi.

A crossover defines the point or region in which one frequency band interfaces with another. Accordingly, the adjoining frequency bands may be referred to as a relatively high frequency band and a relatively low frequency band and the associated drivers may be referred to as a relatively high frequency driver and a relatively low frequency driver regardless of their absolute frequencies. They are high or low relative to each other.

BACKGROUND OF INVENTION

In the prior art, drivers are sometimes placed in coaxial alignment to form a coaxial transducer. The coaxial transducer may contribute to a more consistent sound field or point source. However such coaxial alignment may be prone to mismatch especially when a large diameter driver having relatively low frequency response (low frequency driver) is aligned with a small diameter driver having relatively high frequency response (high frequency driver).

A problem may arise because the high frequency driver typically needs to have a small diameter in order to remain omni-directional to a desired high frequency, while the low frequency driver typically needs to have a large diameter to reach down to a desired low frequency. As a result useful frequency range of the high frequency driver may not reach down to the piston range of the low frequency driver.

There are penalties associated with such a mismatch. Stretching the response of the low frequency driver up in frequency beyond its piston range may cause an inconsistent polar pattern and/or a polar pattern mismatch between drivers and potentially a dip in the frequency response. Stretching the response of the high frequency driver down in frequency beyond its effective output capability may cause a dip in the frequency response. Interaction between the drivers may also cause a loss of output at certain frequencies including potentially a relatively sharp dip in frequency response.

The present invention may provide an acoustic solution to the problem of matching a relatively low frequency driver to a relatively high frequency driver, in particular where there is a gap between the piston range of the low frequency driver and the output capability of the high frequency driver.

More specifically a solution may be desired such that:

a) off axis output of the low frequency driver is acoustically enhanced above its piston range to match off axis output of the high frequency driver in a region of crossover between the high and low frequency drivers;

b) output capability of the high frequency driver is acoustically enhanced below its natural output capability;

c) interference between the drivers is minimised; and/or d) response of the low frequency driver may be acoustically rolled off at a crossover frequency.

In particular a relatively seamless match or crossover between the high frequency driver and the low frequency driver is desirable. A seamless match between the high and low frequency drivers is dependent on there being no sharp transitions in the crossover region. While this is well understood in relation to on axis frequency response, it is often forgotten or not well understood in relation to off axis response. For an omnidirectional loudspeaker it is into the off axis response that most acoustic energy goes and sharp transitions from different off axis responses is far from seamless to a listener, particularly in an acoustically reflective environment and/or in an environment where the listener is off axis, such as in a vehicle. This mismatch is sometimes referred to as an inconsistent polar pattern. If the low frequency driver is not acoustically rolled off it may mix highly directional acoustic radiation in the band of the high frequency driver which is audible at relatively low levels and may further contribute to an audible mismatch between drivers A reference herein to a patent document or other matter which is given as prior art is not to be taken as an admission that that document or matter was known or that the information it contains was part of the common general knowledge as at the priority date of any of the claims.

Throughout the description and claims of the specification, the word "comprise" and variations of the word, such as "comprising" and "comprises", is not intended to exclude other additives, components, integers or steps.

SUMMARY OF INVENTION

According to one aspect of the present invention there is provided an acoustic filter suitable for an electro-acoustic transducer having a relatively high frequency driver and a relatively low frequency driver situated on a common axis, said acoustic filter comprising: a baffle body having an outer side and an inner side, such that said outer side serves as a baffle for said high frequency driver and said inner side forms a first wall of at least one Helmholtz resonator including a chamber and a vent duct communicating with said chamber.

The acoustic filter may comprise: a baffle body having an outer side and an inner side, said baffle body being associated in use with said transducer such said outer side acts as a baffle for said high frequency driver and said inner side forms a first wall of at least one Helmholtz resonator including a chamber and a vent duct communicating with said chamber.

The Helmholtz resonator may act with the baffle body to provide an acoustic crossover between the high and low frequency drivers.

The Helmholtz resonator may give the transducer a vented box characteristic. The high frequency driver and the low frequency driver may include main axes that are substantially coaxial. The low frequency driver may include a cone and the cone may form a second wall of the Helmholtz resonator. The Helmholtz resonator may be tuned to a crossover frequency above which it acoustically rolls off. The baffle body may be adapted to cover from 70% to 100% or more of a piston area associated with the low frequency driver. The baffle body in combination with said high frequency driver may be adapted to cover a piston area associated with said low frequency driver defined by a circular section with a radius about the main axes of at least 80% of a piston radius associated with said low frequency driver.

The baffle body may be adjusted to contribute to vent dimensions and/or to contribute to tuning the Helmholtz resonator to a crossover frequency. The Helmholtz resonator may be adapted to boost output of the low frequency driver above piston range both on-axis and off-axis to substantially restore response perceived by a listener. The Helmholtz resonator may be adapted to create a low pass acoustic filter for the low frequency driver exactly where it may be most useful to contribute to a relatively seamless crossover between the high and low frequency drivers.

The baffle body may be dimensioned to convert low end response of the high frequency driver to half space radiation (2 pi steradian) to theoretically add 6 dB to its low end output capability. The high frequency driver may include a diaphragm and the baffle body may provide separation between the diaphragm of the high frequency driver and the cone of the low frequency driver to reduce cross-talk between the high and low frequency drivers. The Helmholtz resonator may moderate destructive effects of the cross-talk.

Optimum alignment between the high and low frequency drivers may be achieved by trial and error as is known in the art after a crossover frequency has been set. The crossover frequency may be chosen by initially choosing a Helmholtz vent duct area to length ratio that resonates with the chamber of the Helmholtz resonator such that the volume of the chamber substantially determines a high frequency acoustic roll off for the low frequency driver that is above piston range frequency limit of the low frequency driver. The dimensions of the vent duct together with the volume of the chamber may determine the extent of boost provided to the response of the low frequency driver above piston range. A baffle body such as a baffle plate may then be added to substantially cover the cone of the low frequency driver such that it forms an area to length ratio as determined above for the Helmholtz vent duct and a volume as determined above for the chamber of the Helmholtz resonator.

Low frequency acoustic roll off of the high frequency driver may then be observed with the baffle plate in place and the high frequency acoustic roll off of the low frequency driver with the baffle in place to make sure they match. If necessary vent duct area of the Helmholtz resonator may be adjusted to optimise a match between the high frequency acoustic roll off of the low frequency driver and the low frequency acoustic roll off of the high frequency driver. The optimisation may be performed by trial and error as is known in the art.

The present invention also provides an electro-acoustic transducer including an acoustic filter as described above.

According to a further aspect of the present invention there is provided a method of acoustically filtering an electro-acoustic transducer having a relatively high frequency driver and a relatively low frequency driver to form an acoustic crossover between said drivers, said method comprising: forming a baffle body having an outer side and an inner side, said baffle body being associated in use with said transducer such said outer side acts as a baffle for said high frequency driver and said inner side forms a first wall of at least one Helmholtz resonator including a chamber and a vent duct communicating with said chamber wherein the baffle body is arranged to convert low end response of the high frequency driver to half space radiation (2 pi steradian); wherein said Helmholtz resonator acts with said baffle body to provide an acoustic crossover between said drivers; and wherein said low frequency driver includes a cone and wherein said cone forms a second wall of said Helmholtz resonator.

BRIEF DESCRIPTION OF DRAWINGS

FIGS. 1*a* and 1*b* shows an acoustic crossover filter for a low frequency driver crossing to a high frequency driver according to the present invention.

FIGS. 2*a* and 2*b* shows a practical example of a coaxial transducer fitted with an acoustic crossover filter.

DETAILED DESCRIPTION

Figure 3:
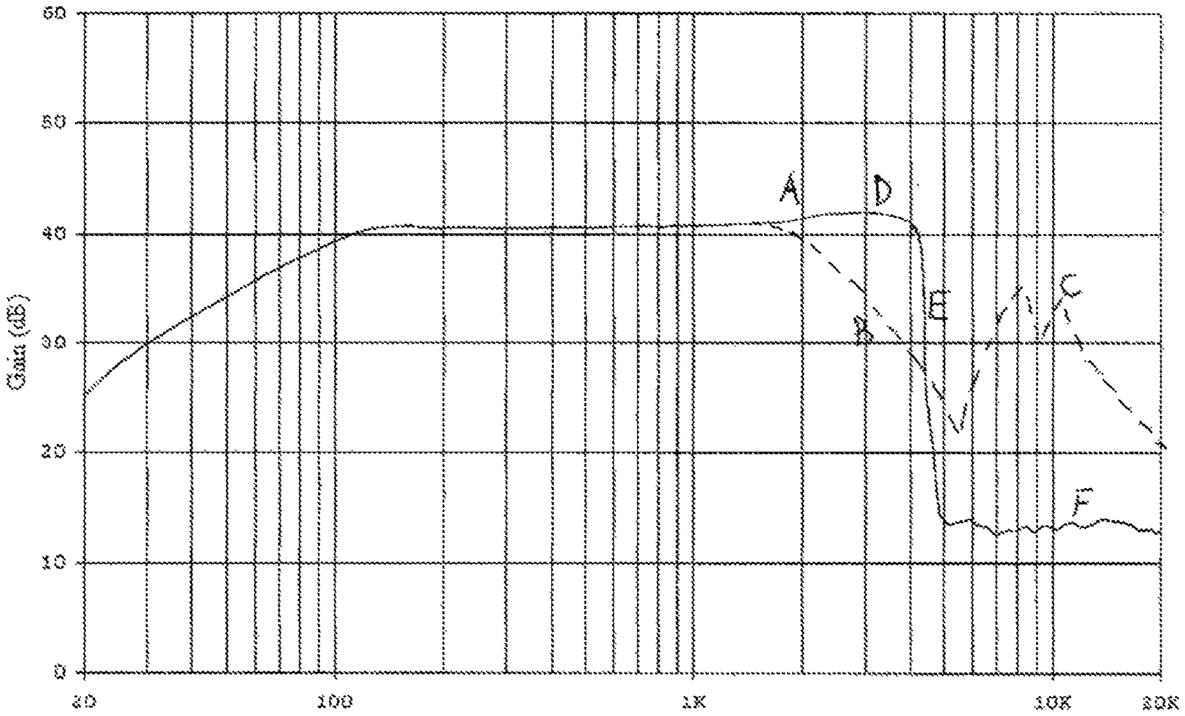
FIG. 3 shows off axis frequency response of a mid-range driver before and after adding an acoustic filter according to the present invention.

Preferred embodiments of the present invention will now be described in conjunction with the accompanying drawings. The attached drawings are intended to show the breadth of scope of the present invention. In particular FIGS. 1*a* and 1*b* show a pedestal mounted tweeter as is common in the art and FIGS. 2*a* and 2*b* show an independently mounted tweeter.

FIGS. 1*a* and 1*b* show coaxial transducer 10 comprising a relatively low frequency driver such as a mid-range driver 11 and a relatively high frequency driver such as a tweeter 12. The cone 13 of mid-range driver 11 is shown together with its surround 14. A person skilled in the art may readily identify mid-range driver 11 from the parts shown in FIGS. 1*a* and 1*b*.

Tweeter 12 is shown mounted on pedestal 15 which passes through cone 13 of mid-range driver 11. Helmholtz resonator chamber 16 is formed between baffle body or plate 17 and cone 13 of mid-range driver 11. Baffle body 17 substantially covers cone 13 except for vent 18 for air to escape. Baffle body 17 acts as a baffle for tweeter 12 while also minimizing undesirable interaction between mid-range driver 11 and tweeter 12.

Helmholtz resonator 16 may be tuned to provide an acoustic roll-off at an appropriate crossover frequency. The crossover frequency may be in a range above piston range of mid-range driver 11 and below what may be a limit of acceptable output capability of tweeter 12, if tweeter 12 did not have baffle body 17. Interaction of tweeter 12 with Helmholtz resonator 16 may assist with alignment of drivers 11, 12 by adjusting the crossover frequency, baffle size, and/or parameters associated with tweeter 12.

FIGS. 2*a* and 2*b* show coaxial transducer 20 comprising a relatively low frequency driver such as mid-range driver 21 and a relatively high frequency driver such as tweeter 22. FIG. 2*b* shows a cross-sectional view. Cone 23 of mid-range driver 21 is shown together with its surround 24. A person skilled in the art may readily identify mid-range driver 21 from the parts shown in FIGS. 2*a* and 2*b*.

Tweeter 22 is shown mounted in circular body 25 which in turn may be mounted to a frame (not shown) associated with mid-range driver 21. Circular body 25 may form a baffle plate. The internal wall of body/baffle plate 25 in combination with tweeter 22 may form a first or outer wall of chamber 26. Cone 23 of mid-range driver 21 may form a second or inner wall of chamber 26. Chamber 26 may serve as a Helmholtz resonator chamber with air trapped therein. Annular gap 27 between body/baffle plate 25 and cone 23 may serve as a vent duct for the Helmholtz resonator. Mounting pillars 28 may be adjustable in height to control the size of gap 27.

The volume of air trapped in chamber 26 may be minimised as shown in FIG. 2*b*, to produce acceptable tuning for the acoustic crossover filter. The Helmholtz resonator generated high frequency extension of mid-range driver 21 may boost frequency response of transducer 20 up to a frequency chosen for the crossover.

The boost in frequency response provided by an acoustic crossover filter according to the present invention has been shown to have an audible effect of compensating for lack of off-axis response above a piston range. Listening tests have confirmed that a transducer incorporating such an acoustic crossover filter is perceived to have flat frequency response over a wide range of listening angles and the result is almost indistinguishable from a continuously omni-directional flat response. One advantage of using a Helmholtz resonator to boost frequency response is that it may maintain output capability, which may otherwise be lost if instead electrical equalization was used to provide extension and/or boost.

The outer wall of body/baffle plate 25 serves as a baffle for tweeter 22 and theoretically boosts its low frequency output capability by 6 dB. Low end response of tweeter 22 may be adjusted by adjusting its baffle size (diameter if circular) such that all tweeter radiation is into a half space (2 pi steradians). For obvious reasons this may be more effective if body/baffle plate 25 is substantially circular. At this size mutual coupling of tweeter 22 to the Helmholtz resonator may be substantially optimized and minor adjustments may be made to the size (diameter if circular) of body/baffle plate 25 to complete an optimisation. This may be done by trial and error as is known in the art without undue experimentation. As a guide the baffle plate 25 may substantially cover the cone 23 as shown in FIGS. 1*a*, 1*b*, 2*a* and 2*b*. Listening tests at various angles should show a uniformity of response. FIG. 3 shows off axis frequency response of a mid-range driver before adding an acoustic filter (shown in dotted line) and after adding an acoustic filter (shown in solid line) according to the present invention. The off axis mid-range driver roll off is caused by tuning the Helmholtz resonator up to an octave above piston range to minimize peaking and to maximize steepness of roll off.

The dotted response curve shows a substantial loss of output above A which coincides with the upper limit of piston range for the mid-range driver. It is the frequency at which parts of the acoustic waves interact with each other causing off axis cancellations in the radiation pattern. The curve is seen to undergo a roll off B and then a rebound C at higher frequencies. The rebound may be quite varied for different drivers and at different angles off axis. However any rebound may cause a problem because it contributes to sudden changes in the polar pattern and cannot be equalized electrically.

The solid curve shows how an acoustic filter according to the present invention may boost the response in the region A to D and then cause a sharp roll off at E, followed by substantial attenuation F at higher frequencies. The amount of boost may be controlled by adjusting volume of the Helmholtz chamber and/or dimensions of the vent duct. The response of this example may be suitable for a car door application and shows how an extreme amount of boost is possible.

Figure 4:
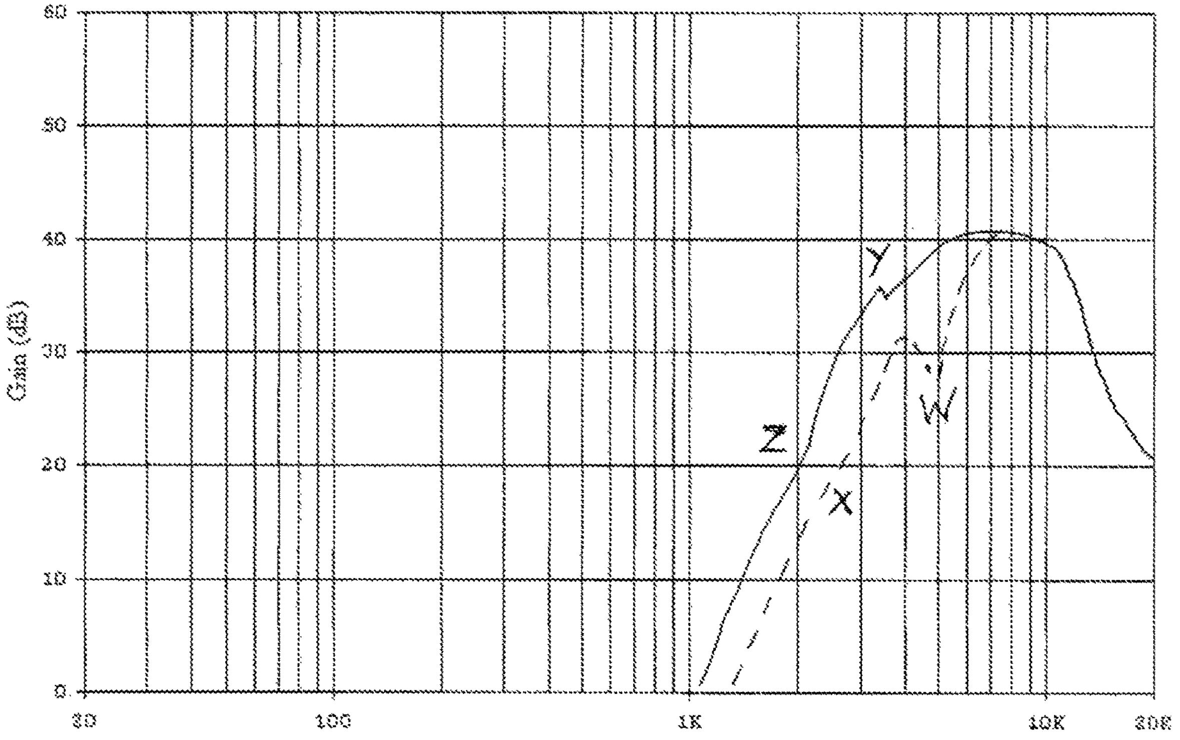
FIG. 4 shows off axis frequency response of a tweeter before and after adding an acoustic filter according to the present invention.

FIG. 4 shows off axis frequency response of a tweeter before adding an acoustic filter (shown in dotted line) and after adding acoustic filter 9 (shown in solid line) according to the present invention.

The dotted curve shows loss of output capability at the lower end of the response X such that it cannot match up with the mid-range driver. It also shows relatively severe deviation W in the response caused by interaction between the tweeter and the mid-range driver.

The solid curve shows how an extended baffle may boost response at the low end Z and further shows how an acoustic filter may attenuate deviation Y in the response.

Figure 5:
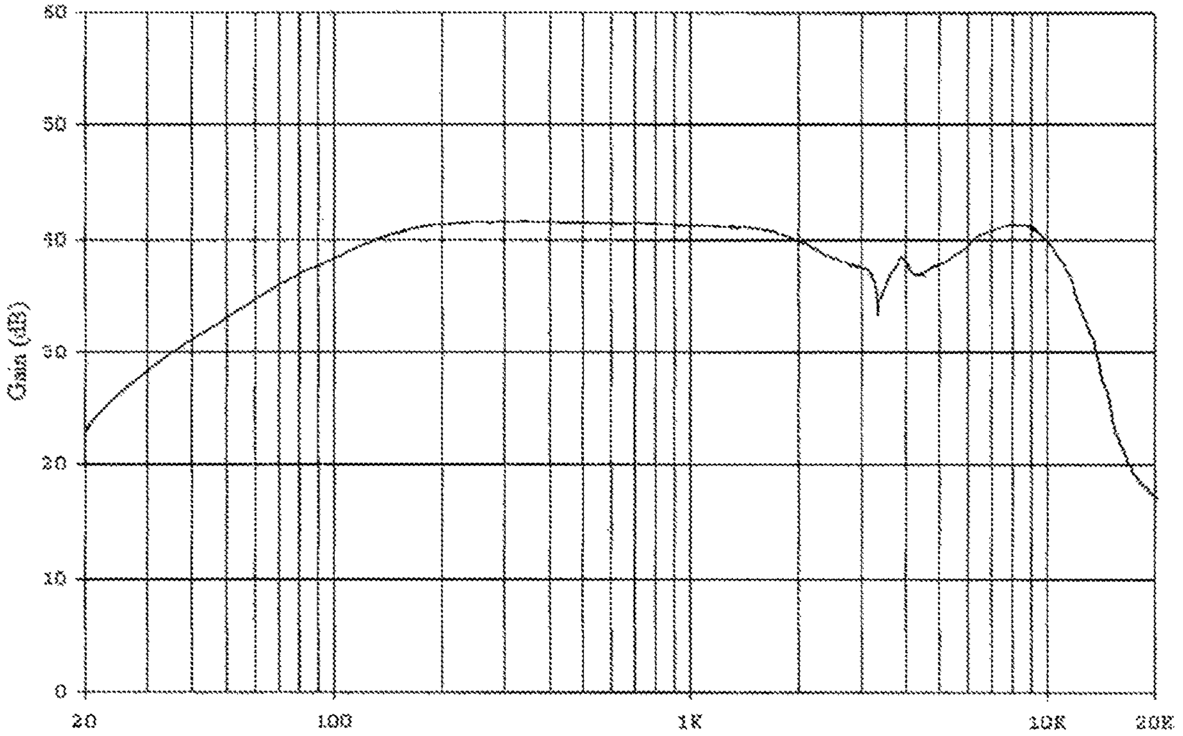
FIG. 5 shows a typical off axis frequency response for a coaxial driver without an acoustic filter.

FIG. 5 shows a typical off axis frequency response curve for a coaxial driver wherein output capability of a high frequency driver does not reach down to piston range of a low frequency driver.

Figure 6:
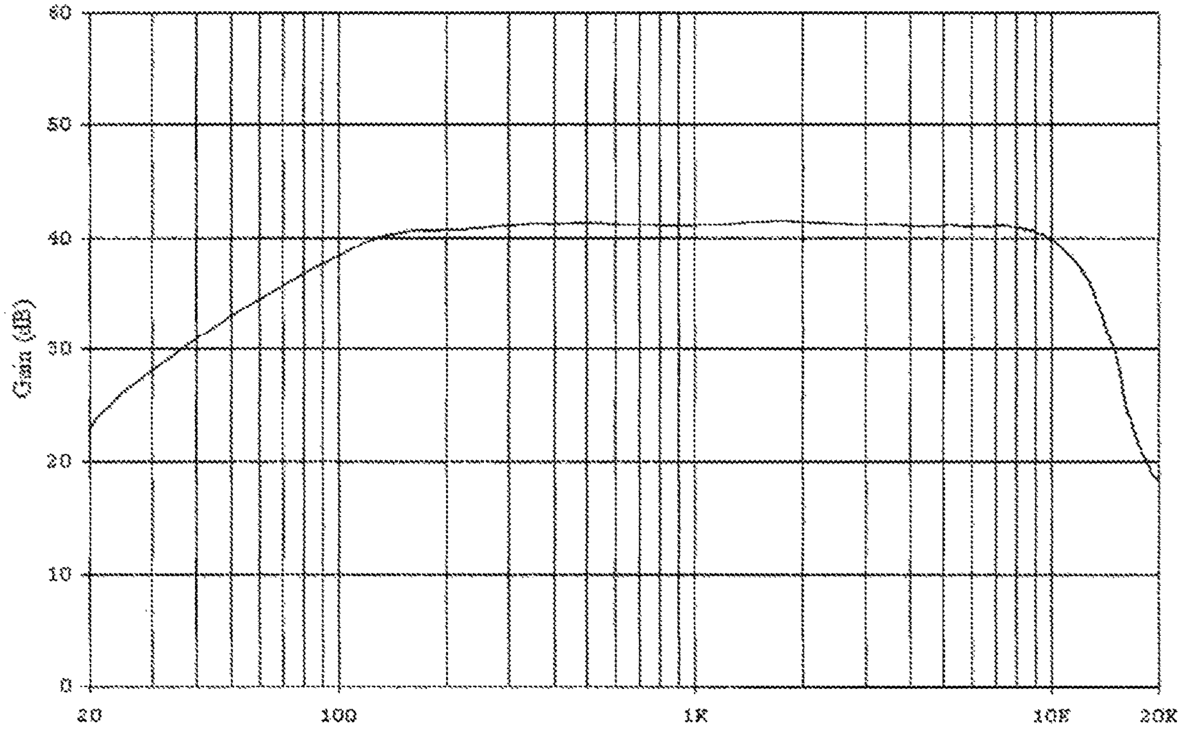
FIG. 6 shows a typical off axis frequency response of a coaxial driver including an acoustic filter according to the present invention.

FIG. 6 shows a typical off axis frequency response curve for a coaxial driver including an acoustic filter according to the present invention which provides a seamless crossover even though output capability of the high frequency driver may not reach down to piston range of a low frequency driver.

The components of the acoustic crossover filter of the present invention should not be confused with a phase plug or a secondary cone.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. An acoustic filter suitable for an electro-acoustic transducer having a relatively high frequency driver and a relatively low frequency driver situated on a common axis, said acoustic filter comprising:

a baffle body having an outer side and an inner side, such that said outer side serves as a baffle for said high frequency driver and said inner side forms a first wall of at least one Helmholtz resonator including a chamber and a vent duct communicating with said chamber wherein the baffle body is arranged to convert low end response of the high frequency driver to half space radiation (2 pi steradian);

wherein said Helmholtz resonator acts with said baffle body to provide an acoustic crossover between said drivers, and wherein said Helmholtz resonator is adapted to boost output of said low frequency driver above piston range both on-axis and off-axis to provide a response perceived by a listener to be substantially flat over a wide range of listening angles; and wherein said low frequency driver includes a cone and wherein said cone forms a second wall of said Helmholtz resonator.

2. An acoustic filter according to claim 1 wherein said Helmholtz resonator is tuned to a crossover frequency above which it acoustically rolls off.

3. An acoustic filter according to claim 1 wherein said baffle body in combination with said high frequency driver is adapted to cover a piston area associated with said low frequency driver defined by a circular section with a radius about the main axes of at least 80% of a piston radius associated with said low frequency driver.

4. An acoustic filter according to claim 1 wherein said baffle body is adjusted to contribute to vent dimensions and/or to contribute to tuning said Helmholtz resonator to a crossover frequency.

5. An acoustic filter according to claim 1 wherein said high frequency driver includes a diaphragm and said baffle body provides separation between said diaphragm of said high frequency driver and the cone of said low frequency driver to reduce cross-talk between said high and low frequency drivers.

6. An electro-acoustic transducer according to claim 1 including an acoustic filter.

7. A method of acoustically filtering an electro-acoustic transducer having a relatively high frequency driver and a relatively low frequency driver situated on a common axis to form an acoustic crossover between said drivers, said method comprising:

forming a baffle body having an outer side and an inner side, such that said outer side acts as a baffle for said high frequency driver and said inner side forms a first wall of at least one Helmholtz resonator including a chamber and a vent duct communicating with said chamber wherein the baffle body is arranged to convert low end response of the high frequency driver to half space radiation (2 pi steradian);

wherein said Helmholtz resonator acts with said baffle body to provide an acoustic crossover between said drivers;

adapting said Helmholtz resonator to boost output of said low frequency driver above piston range both on-axis and off-axis to provide a response perceived by a listener to be substantially flat over a wide range of listening angles; and wherein said low frequency driver includes a cone and wherein said cone forms a second wall of said Helmholtz resonator.

8. A method according to claim 7 including tuning said Helmholtz resonator to a crossover frequency above which it acoustically rolls off.

9. A method according to claim 7 including adapting said baffle body in combination with said high frequency driver to cover a piston area associated with said low frequency driver defined by a circular section with a radius about the main axes of at least 80% of a piston radius associated with said low frequency driver.

10. A method according to claim 7 including adjusting said baffle body such that it contributes to vent dimensions and/or contributes to tuning said Helmholtz resonator to a crossover frequency.

11. A method according to claim 9 wherein said high frequency driver includes a diaphragm and including arranging said baffle body to provide separation between said diaphragm of said high frequency driver and the cone of said low frequency driver to reduce cross-talk between said high and low frequency drivers.

* * * * *